Sept. 6, 1960 J. ADAMS ET AL 2,951,948
FLYING-SPOT SCANNING SYSTEMS
Filed June 9, 1958
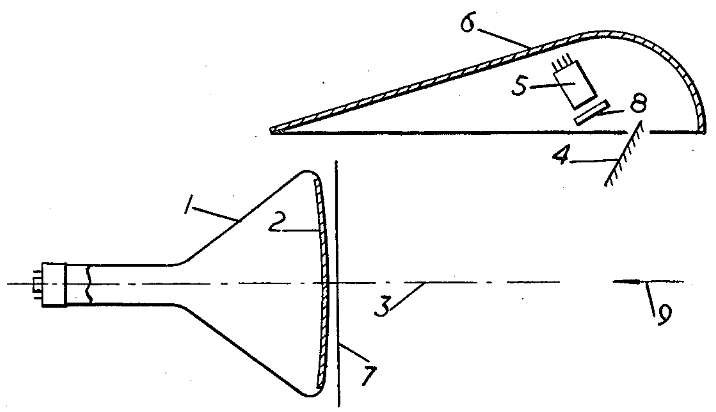
Inventors
John Adams
Michael Duke Dudley
By
Cameron, Kerkam & Sutton
Attorneys United States Patent Office 2,951,948

Patented Sept. 6, 1960

2,951,948

FLYING-SPOT SCANNING SYSTEMS

John Adams, Newton-le-Willows, and Michael Duke Dudley, Cheadle, England, assignors to Ferranti, Limited, Lancashire, England, a company of Great Britain and Northern Ireland Filed June 9, 1958, Ser. No. 740,681

Claims priority, application Great Britain June 19, 1957

6 Claims. (Cl. 250—217)

This invention relates to flying-spot scanning systems of the kind including a photo-electric pick-up device arranged to be irradiated by light from the screen of a cathode-ray tube, and to cathode-ray tubes for such systems.

In a cathode-ray tube used as a flying-spot scanner it is essential for efficient transmission that the decay rate or persistence of the screen phosphor should be as rapid as possible, preferably of the order of 0.1 microsecond, or even less. The only known kinds of phosphor with this rapid-decay property are those emitting light in the ultra-violet and long-ultra-violet parts of the spectrum.

Where it is desired to derive from the screen, simultaneously with the transmission, a visible display, a difficulty is experienced owing to the fact that the eye is insensitive to the light in those parts of the spectrum.

An object of the invention is to provide a flying-spot scanning system of the kind set forth wherein the cathode-ray tube has a phosphor screen which is suitable for transmission in flying-spot scanning and for simultaneously providing a visible display, without the efficiency of the transmission being thereby appreciably impaired.

In accordance with the present invention there is provided a flying-spot scanning system including a cathode-ray tube having a screen composed of a first phosphor for emission in the spectral range ultra-violet to long-ultra-violet and having a persistence short enough for flying-spot scanning combined with a second phosphor for visible emission in a spectral range not appreciably overlapping the spectral range of the first phosphor and having a persistence long enough to sufficiently minimise visible flicker, a photo-electric pick-up device arranged to be irradiated by light from said screen due to scanning thereof by the beam of the tube, interposed in the optical path between said screen and said device an optical filter to prevent the device being appreciably affected by the visible afterglow of the second phosphor, and means for interposing the object to be scanned in the optical path between said screen and the filter where the object may be viewed during the scanning process.

The first and the second phosphor are for emission in the spectral ranges 3800 to 4200 and 5000 to 7000 Angstrom units respectively.

Also in accordance with the invention there is provided for use in a fllying-spot scanning system a cathode-ray tube having a screen composed as set forth in either of the preceding paragraphs.

The accompanying drawing is a view, partly in section, of a flying-spot scanning system in accordance with one embodiment of the invention.

In carrying out the invention according to one form by way of example, a flying-spot scanning system includes a cathode-ray tube 1 having the usual electrodes (not shown) for projecting and deflecting an electron beam. The screen 2 is composed of a mixture of two phosphors. One of these phosphors is of the kind which when scanned by an electron beam emits light in the long-ultra-violet part of the spectrum and possesses a short enough persistence—of the order, say, of 0.1 microsecond—for flying-spot scanning. This phosphor will hereinafter be referred to for convenience as the ultra-violet phosphor.

The other phosphor is such as to provide a visible emission in a spectral range which does not overlap that of the ultra-violet phosphor; this visible phosphor has a comparatively long persistence, a suitable value for which will be indicated later.

Somewhat above the centreline 3 of the tube is a mirror 4 arranged to reflect light from all parts of screen 2 to a photo-electric pick-up device in the form of a photo-multiplier tube 5. Mirror 4 and tube 5 are sufficiently encased by a hood 6 to shield tube 5 from extraneous light.

In front of screen 2 and between it and mirror 4 is some means 7, such as a sheet of transparent material, to carry the information or other object to be scanned.

Between pick-up tube 5 and mirror 4 is an optical filter 8 such as to shield tube 5 from light in the spectral range emitted by the visible phosphor. Filter 8 is thus in the optical path between screen 2 and tube 5, and the sheet 7 is in the optical path from screen 2 to filter 8.

In operation, the apparatus functions in respect of all components except the visible phosphor and the optical filter 8 exactly as a normal kind of flying-spot scanning system, pick-up tube 5 responding to the light from the scanning spot on the ultra-violet one of the two screen phosphors whenever the spot is not obscured by a part of the object scanned.

The effect of the visible phosphor is to provide a display of the object scanned to an observer stationed approximately in line with centreline 3 and looking in the direction of the arrow 9. This phosphor is accordingly arranged to have a composition such as to provide a persistence or afterglow long enough to minimise visible flicker sufficiently to render it imperceptible, or at least tolerable if perceptible, to the observer. A suitable persistence for this phosphor is thus dependent on the frame scan frequency employed. Where this frequency has one of the standard values of 50 or 60 frames per second a phosphor having a persistence of not less than 20 millisecs. will usually be suitable.

The upper limit of the persistence of the visible phosphor is determined by the required rate of changing of the objects scanned, for where a number of stationary objects have to be scanned in succession it would be clearly undesirable if the scanning of each one had to be delayed until the afterglow of the visible phosphor resulting from the scanning of the previous one had sufficiently died down. Similarly where the object scanned is a moving one, the persistence should not be long enough to blur the movement as seen by the observer. In each of these cases the most satisfactory value of the persistence is usually that which is just sufficient to render the flicker imperceptible.

The effect of filter 8 is to prevent pick-up tube 5 from being appreciably affected by the afterglow from the visible phosphor, since if tube 5 were so affected the efficiency of the system would obviously be impaired. The fact that the spectral range of the visible phosphor does not overlap that of the ultra-violet phosphor allows the filter to perform this shielding action without appreciably reducing the amount of ultra-violet light which passes to the pick-up tube from the scanning spot. It is not, however, essential that there should be no overlap whatever between the two spectral ranges; a small extent of overlap due to an extension of the visible phosphor into the ultra-violet region may be tolerable. But as will readily be understood any appreciable extent of such overlap will impair the efficiency of the transmission.

It is of course necessary to arrange the optical system so as to allow the object to be viewed during the scanning process. In other words, none of components 4, 5, 6, and 8 should be so disposed as to conceal the object from the observer.

Suitable spectral ranges in Angstrom units for the two phosphors are 3800 to 4200 for the ultra-violet phosphor and 5000 to 7000 for the visible phosphor.

For convenience in manufacture and for good luminous efficiency the visible phosphor may be ultra-violet sensitive and of an orange-red colour, the resulting display being a saturated magneta in hue; a zinc/cadmium-sulphide phosphor is suitable.

Other suitable visible phosphors are willemite phosphor for a green display or cadmium chlorophosphate for a yellow display. A combination of the latter with an akermanite phosphor for the ultra-violet phosphor provides a particularly satisfactory flicker-free display at a scanning rate of 50 frames per second.

The two component phosphors may for convenience be combined as a mixture. Where however their respective chemical ingredients are unsuitable for mixing, the two may be combined as a double layer; in which case the order of the layers along the tube axis—that is to say, which is nearer to the gun—is not important.

A system in accordance with the invention serves very satisfactorily the two purposes of supplying a flying-spot transmission and of simultaneously providing a display of the object scanned.

What we claim is:

1. A flying-spot scanning system including a cathode-ray tube having a screen composed of a first phosphor for emission in the spectral range ultra-violet to long-ultra-violet and having a persistence short enough for flying-spot scanning combined with a second phosphor for visible emission in a spectral range not appreciable overlapping the spectral range of the first phosphor and having a persistence long enough to sufficiently minimise visible flicker, a photo-electric pick-up device arranged to be irradiated by light from said screen in the spectral range of the first phosphor due to scanning thereof by the beam of the tube, interposed in the optical path between said screen and said device an optical filter to prevent the device being appreciably affected by the visible afterglow of the second phosphor, and means for interposing the object to be scanned in the optical path between said screen and the filter at a point where the object may be viewed in the visible light emitted by the second phosphor simultaneously with the scanning process.

2. A system as claimed in claim 1 wherein the first and the second phosphors are for emission in the spectral ranges 3800 to 4200 and 5000 to 7000 Angstrom units respectively.

3. A system as claimed in claim 1 wherein the second phosphor is a zinc/cadmium-sulphide phosphor.

4. A system as claimed in claim 1 wherein the second phosphor is a willemite phosphor.

5. A system as claimed in claim 1 wherein the second phosphor is cadmium chlorophosphate.

6. A system as claimed in claim 5 wherein the first phosphor is an akermanite phosphor.

References Cited in the file of this patent

UNITED STATES PATENTS

| | | |
|---|---|---|
| 2,553,182 | Cage | May 15, 1951 |
| 2,563,472 | Leverenz | Aug. 7, 1951 |
| 2,587,074 | Sziklai | Feb. 26, 1952 |
| 2,797,256 | Millspaugh | June 25, 1957 |
| 2,816,246 | Bliss | Dec. 10, 1957 |